Patented Sept. 28, 1954

2,690,423

UNITED STATES PATENT OFFICE 2,690,423

PHOTOCHEMICALLY PRODUCED COPOLYMERS

Wilhelm Moschel and Wilhelm Müller, Leverkusen, Germany, assignors to Farbenfabriken Bayer Aktiengesellschaft, Leverkusen, Germany, a corporation of Germany No Drawing. Application August 7, 1951, Serial No. 240,784

Claims priority, application Germany August 26, 1950

2 Claims. (Cl. 204—158)

The present invention is a novel copolymer and a process of producing same.

Polymers and copolymers of ethene, ethylidene compounds etc. have previously been obtained by irradiation with light, preferably from an ultraviolet light source. The polymers and copolymers thus obtained are hydrocarbons, hydrocarbon halides etc. with double bonds.

In accordance with the present invention, a novel copolymer is one containing trifluoro chloroethene and a silicic acid ester. This copolymer may be obtained by exposing a mixture containing trifluoro chloroethene and a silicic acid ester to irradiation with light, preferably of wave lengths in the range of 2200 to 6000 Angström Units. Alkyl as well as aryl esters of the silicic acid come into consideration as, for instance, methyl, ethyl, propyl, butyl, isopropyl, hexyl, amyl, phenyl, tolyl, benzyl, naphthyl silicates. Mixtures of equal parts by volume of an organic silicate and trifluoro chloroethene can be copolymerized but also mixtures containing one of the reactants in surplus. It is preferred to copolymerize mixtures containing a greater quantity by volume of the trifluoro chloroethene than of the silicic acid ester. The products obtained according to the invention are uniform compounds which are useful as intermediates for the manufacture of plastics.

The invention is further illustrated by the following example without being restricted thereto.

Example

A liquid mixture containing 80% by volume of trifluoro chloroethene and 20% by volume of ethyl silicate is exposed to irradiation with ultraviolet light. The liquid becomes viscous after 1-2 hours. After 36 hours the volume of the viscous liquid has been concentrated to about ⅓ of the previous volume. An oil is thus obtained which solidifies at room temperature in the form of a grease. The product is charred only at temperatures from 250° C.

We claim:

1. A copolymeric product of the irradiation reaction with the light of wave length in the range of 2,200 to 6,000 Angstrom units of from 50 to 80 per cent by volume of trifluorochlorethene and from 50 to 20 per cent by volume of an ortho silicic acid ester.

2. A copolymeric product of the irradiation reaction with the light of wave length in the range of 2,200 to 6,000 Angstrom units of 80 per cent by volume of trifluorochloroethene and 20 per cent by volume of ethyl ortho silicate, said product being a greasy material at room temperatures and charring at temperatures of about 250° C. and higher.

References Cited in the file of this patent

UNITED STATES PATENTS

| Number | Name | Date |
|---|---|---|
| 2,281,768 | Heerema et al. | May 5, 1942 |
| 2,344,785 | Owens et al. | Mar. 21, 1944 |
| 2,392,378 | Hanford | Jan. 8, 1946 |
| 2,407,181 | Scott | Sept. 3, 1946 |
| 2,420,222 | Benning et al. | May 6, 1947 |
| 2,433,844 | Hanford | Jan. 6, 1948 |
| 2,456,255 | Coffman et al. | Dec. 14, 1948 |
| 2,471,959 | Hunt | May 31, 1949 |
| 2,478,390 | Hanford | Aug. 9, 1949 |
| 2,564,024 | Miller | Aug. 14, 1951 |
| 2,569,524 | Hamilton | Oct. 2, 1951 |